2,093,404

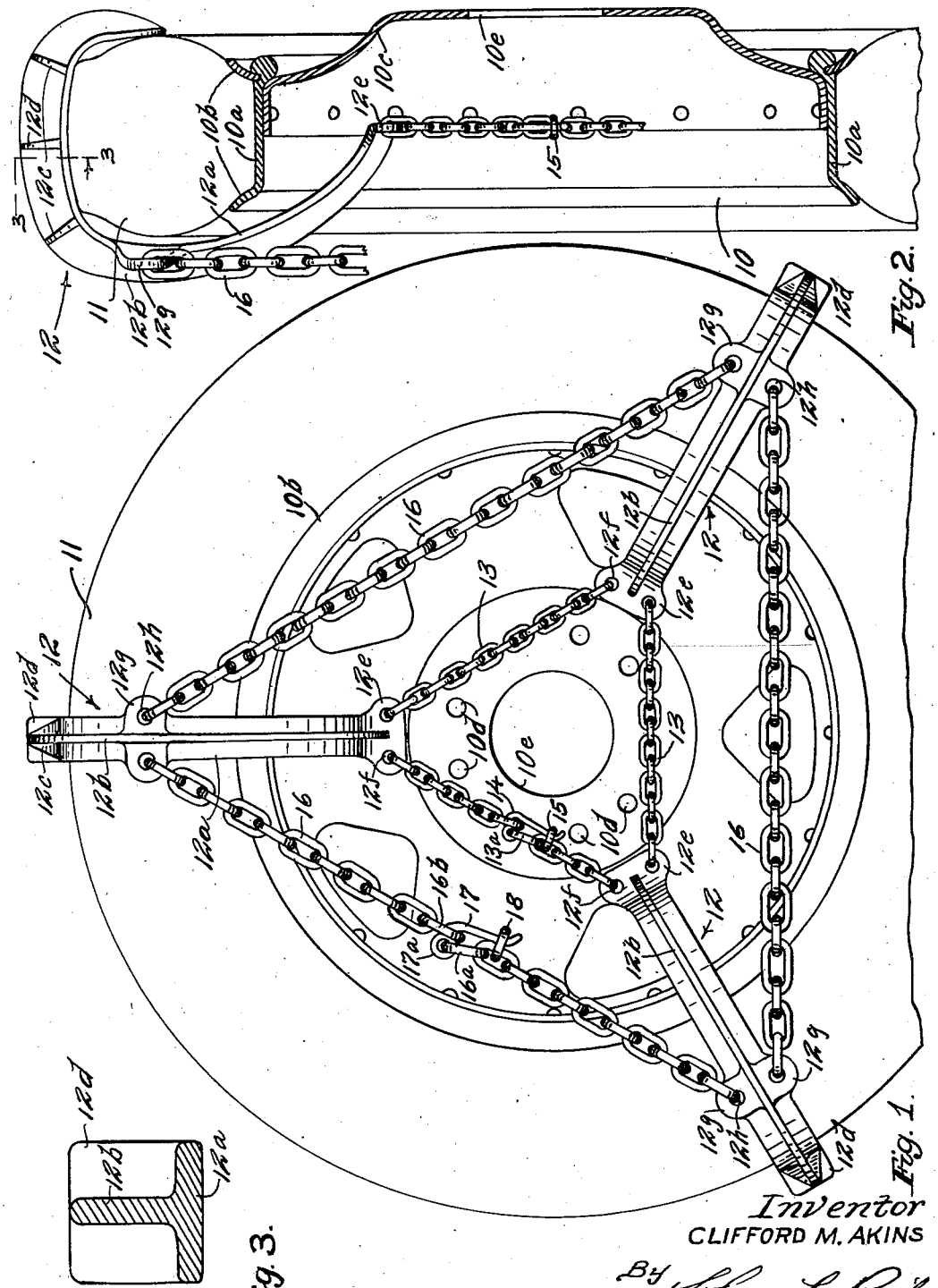
Sept. 21, 1937.  C. M. AKINS  2,093,404
TRACTION LUG AND ASSEMBLY
Filed Aug. 25, 1934
Inventor
CLIFFORD M. AKINS
By Chas. C. Rey.
Attorney Patented Sept. 21, 1937

UNITED STATES PATENT OFFICE 2,093,404

TRACTION LUG AND ASSEMBLY

Clifford M. Akins, Minneapolis, Minn.

Application August 25, 1934, Serial No. 741,410

6 Claims. (Cl. 152—14)

This invention relates to a traction device for vehicles, and particularly to a traction lug or mud lug and the assembly thereof on a tire.

It is the experience of most truck owners to have the truck become mired or stuck in soft ground, snow or ice, particularly when the truck is heavily loaded. For this reason it is necessary for most truck owners to employ some kind of tire chain. Such chains are expensive, wear out quickly and are more or less troublesome to apply. It is desirable to have some traction means which can be quickly placed on the tire and which will be durable and comparatively inexpensive.

It is an object of this invention to provide a simple, inexpensive and efficient form of traction lug or mud lug.

It is a further object of the invention to provide a traction lug assembly which is easily placed on the tire and which will act efficiently as a traction device.

It is still another object of the invention to provide a traction lug having an outer hooklike portion adapted to extend transversely across the tire tread and having an arm extending inwardly of said tire to a point disposed substantially in the circumferential central plane of said tire.

It is also an object of the invention to provide a traction lug assembly comprising a plurality of lugs such as set forth in the preceding paragraph, the same being circumferentially spaced about a tire and having flexible means extending between the inner ends of said arms in substantially the central circumferential plane of said tire whereby a rocking or other movement of one of said lugs at the tread will move said arm and said movement will be transmitted to the other arms and lugs and cause the lugs to bind on the tire.

It is another object of the invention to provide a traction lug assembly comprising a plurality of lugs circumferentially spaced about the tire, each having an outer hook-like portion extending transversely over the tire and having an arm extending inwardly, flexible means connecting said arms substantially at their inner ends and another flexible means connecting said arms between their inner ends and said hook-like portions.

It is still another object of the invention to provide a traction lug assembly comprising a plurality of lugs circumferentially spaced about the tire, each having an outer portion extending over the tire and an arm extending inwardly and a plurality of flexible means connecting said arms and spaced radially of said arms.

These and other objects and advantages of the invention will be fully set forth in the following description made in connection with the accompanying drawing, in which like reference characters refer to similar parts throughout the several views and in which:—

Fig. 1 is a side view of a tire with the invention applied thereto;

Fig. 2 is a vertical central section through the tire and wheel showing the invention thereon; and Fig. 3 is a vertical section taken on line 3—3 of Fig. 2 as indicated by the arrow.

Referring to the drawing, a wheel 10 is shown of the disk type, the same having a rim 10a having the tire-receiving flanges 10b and a central disk portion 10c. Said disk 10c is shown as having attaching bolt holes 10d circumferentially spaced adjacent its center and as having a center opening 10e. A tire 11 is shown as extending about the rim 10a within the flanges 10b, said tire being of the usual construction used on trucks.

In accordance with the present invention a plurality of tire lugs 12 are provided and these are disposed in circumferentially spaced relation about the tire. Each lug 12 comprises an outer portion which extends across and engages the tire tread. The surface of said portion engaging and extending across the tire is substantially flat as shown in Figs. 1 and 3. Said outer portion has a terminal part extending inwardly along one side of the tire and in a general direction substantially at right angles to said outer portion. Said lug also has an arm extending from the other end of said outer portion along the opposite side of the tire and inwardly, said arm extending to a point or plane substantially coincident with the central plane of the tire. While the lug 12 might be of various formations, in the embodiment of the invention illustrated it is shown as having an inner rib or flange 12a which is adjacent the tire and as having a rib 12b extending outwardly substantially at right angles to and centrally of the flange 12a. A plurality of spaced ribs 12c and 12d extend along the sides of central rib 12b at the outer portion of the lug, the outer ribs 12c being triangular in shape, and extending to the outer edge of rib 12b while central rib 12d is substantially rectangular in form as shown in Figs. 1 and 2. The flange 12a connects with a flange 12e which extends in a plane substantially coincident with the central circumferential plane of the tire, the same being wider than flange 12a and having therein a pair of circumferentially spaced holes 12f disposed at equal distances from rib 12b. Chains 13 extend between the ends of said lug arms having their terminal links in the holes 12f. One of the chains 13 is provided with a readily detachable coupling. While various types of couplings might be used, in the embodiment of the invention illustrated a coupling is shown comprising a hook 14 having an eyelet connected to one of the links 13a of the chain and adapted to hook through one of the other links of the chain. A ring 15 is provided passing through the link adjacent link 13a and adapted to hook over the end of hook 14 to hold the same in engaged position.

The member 12 has a pair of lugs or ears 12g formed thereon between flange 12e and the outer portion thereof. The lugs 12g are disposed centrally of the rib 12b and the rib 12a is curved to connect with the outer and inner sides of the same. Lugs 12g are provided with spaced apertures 12h equi-distant from the central rib 12b. It will be seen from Figures 1 and 2 that the ears of lugs 12g are disposed at the side of the tire and outside of the zone defined by the planes in which the sides of the tire are disposed. Chains 16 are provided and have their end links disposed respectively in the holes 12h and extend between lugs 12 as shown in Figure 1. These chains are also disposed at one side of the tire as shown in Figure 1. As shown in Figure 1 chains 16 are of heavier construction and stronger than chains 13. One of the chains 16 is divided and provided with a readily detachable coupling. While various types of couplings may be used, in the embodiment of the invention illustrated, one link 16a is secured to an eyelet 17a at the end of a hook lever 17. Lever 17 is adapted to pass through the adjacent link 16b, said chain being open between links 16a and 16b. A ring 18 is provided adapted to engage over the end of lever 17 to hold the same in position when connecting the parts of chain 16.

In operation when the lug assembly is to be used the lugs 12 will be placed over the tire in spaced relation as shown in the drawing. The couplings formed by the hooks or levers 14 and 17 will at this time be open or detached so that the chains having the same therein are divided. The outer portion of the lug 12 forms in effect a hook and the lugs can readily be placed over the tire with the outer portion extending transversely of the tread and then moved to the desired spaced relation. The ends of the divided chain 13 will now be brought together and the end of lever 14 will be inserted through the end link of the adjacent chain section and the lever swung to the position shown in Fig. 1. Due to the shape of lever 14 this swinging exerts a pull or drawing action on the chain so as to tighten the same. When lever 14 is in the position shown in Figure 1 the ring 15 is moved over the end thereof and said lever is then held in position connecting the sections of chain 13. The ends of the divided chain 16 are now brought adjacent each other and lever 17 is engaged through link 16b and swung to the position shown in Figure 1. This swinging action exerts a pull or drawing effect on the chain thus tightening the same. When lever 17 is in the position shown in Figure 1 the ring 18 is moved over the end thereof and said lever is then held in closed position.

The lug assembly is now in operative position on the tire. If one of the lugs 12 rocks about its surface which engages the tread of the tire, the arm of the lug 12 will be moved or swung and this will cause a pull on the chains 13 thus transmitting the movement of the arms of the other lugs. The lugs are thus caused to bind on the tire and press into the tread. The lugs thus grip the tire and good traction is secured. The lugs therefore act together due to the connection with the flexible members or chains 13, and all tightly grip the tire. It will also be seen that due to the fact that the ends of the arms and the terminal flanges 12h are in the central circumferential plane of the tire, that any swinging movement of the arms 12c has no tendency to displace the lugs on the tire. The pull or stress exerted on the arms 12c by the chains 13 when the lugs are gripping the tire all occurs in said central plane and there is no tendency to move the lugs transversely of the tire or to move them out of a position extending transversely of the tire. The lugs hence keep their proper position and place on the tire.

The chains 16 are provided to assure that there will be no slipping of the lugs 12 about the tire. In traveling in very soft and very slippery mud or material the tire may be distorted by rocking of the lugs 12 to such an extent as to permit the lugs 12 to move about the tire and move together to one point. With the chains 16 provided, however, such a movement is positively prevented. The chains 16 insure that the lugs will be properly spaced and these chains thus cooperate with the chains 13 to cause the lugs to bind or bite into the tire to grip the same. If the lugs cannot move about the tire any strain thereon by the traction cause them to rock about the tread to move inwardly thus gripping the tire more firmly. The chains 16 and 13 act together and the greater portion of the stress is taken by chains 16 so that chains 13 can be of lighter construction or less strength than chains 16. As above stated the chains 13 being disposed in the central circumferential plane of the tire there is no tendency to displace the lugs transversely of the tire and the same are kept in proper position. By having lug 12d of rectangular shape or having a rather long outer edge, a good resistance to side slip of the wheel is secured.

From the above description it is seen that applicant has provided a very simple, efficient and durable traction lug and traction lug assembly and one which functions to produce a very effective traction. The parts can be made very rugged and durable and yet be made at a much lower price than a tire chain. The device exerts a great traction effect and is thus very efficient for the purpose intended. The device has been amply demonstrated in actual practice and found to be very successful.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A traction lug assembly comprising a plurality of lugs circumferentially spaced about the tire and each having an outer portion extending transversely over the tire and having an arm extending inwardly substantially radially, flexible means equal in number to the number of said arms connecting all of said arms at their inner ends and other flexible means equal in number to the number of said arms connecting all of said arms between said inner ends and said outer portions.

2. A traction lug assembly comprising a plurality of lugs circumferentially spaced about the tire each having an outer portion extending transversely over the tire and having an arm extending inwardly substantially radially and a plurality of sets of flexible means extending from each arm to the adjacent arms, said sets being spaced radially of said arms and each comprising the same number of flexible means as there are arms.

3. A traction lug assembly for a vehicle wheel having a rim and a tire thereon comprising a plurality of lugs circumferentially spaced about the tire, each having an outer portion extending over said tire and an arm extending inwardly from said outer portion to a point within a zone between the planes defined by the sides of said rim, flexible means equal in number to the number of said arms connecting the inner ends of said arms within said zone and other means equal in number to the number of said arms connecting said arms and spaced radially outwardly from said first mentioned means.

4. A traction lug assembly comprising a plurality of lugs circumferentially spaced about the tire and each having an outer portion extending over the tire tread and an arm extending inwardly from said outer portion, said arm having circumferentially spaced apertures adjacent its inner end, flexible members having their ends connected respectively in said apertures and extending between said arms, said arms also having circumferentially spaced apertures at points some distance outwardly from said first mentioned apertures and flexible members having their ends respectively secured in said last mentioned apertures and extending between said arms.

5. A traction lug assembly comprising a plurality of lugs circumferentially spaced about the tire and each having an outer portion extending over the tire and an arm extending inwardly from said outer portion to a point substantially in the central circumferential plane of said tire and having a flange disposed substantially in said plane having a pair of circumferentially spaced holes therethrough, chains extending between said arms having links secured in said holes respectively, one of said chains having a quickly detachable coupling therein, said arm also having lugs with circumferentially spaced holes therein between said flange and said outer portion, chains extending between said arms and having links secured in said last mentioned holes respectively, one of said last mentioned chains having a quickly detachable coupling therein.

6. A traction lug having an outer portion adapted to extend transversely across the tire tread and partially along one side thereof and having an arm extending inwardly from said outer portion to a point disposed substantially in the centrally circumferential plane of said tire, said arm having an apertured lug at its inner end adapted to receive connecting means and said arm having an apertured lug at the point disposed substantially at the side of the tire also adapted to receive connecting means.

CLIFFORD M. AKINS.